US011941776B1

(12) United States Patent
Good

(10) Patent No.: US 11,941,776 B1
(45) Date of Patent: Mar. 26, 2024

(54) SYSTEMS AND METHODS FOR IMPROVED INTERACTIVITY WITH THREE-DIMENSIONAL OBJECTS

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/193,108

(22) Filed: Mar. 30, 2023

(51) Int. Cl.
*G06T 7/73* (2017.01)
*G06T 15/20* (2011.01)
*G06T 19/20* (2011.01)

(52) U.S. Cl.
CPC .............. *G06T 19/20* (2013.01); *G06T 7/75* (2017.01); *G06T 15/20* (2013.01); *G06T 2200/24* (2013.01); *G06T 2219/2004* (2013.01); *G06T 2219/2016* (2013.01)

(58) Field of Classification Search
CPC ......... G06T 2200/24; G06T 2219/2004; G06T 2219/2016; G06T 19/20; G06F 3/048; G06F 3/0481; G06F 3/0484; G06F 3/04842; G06F 16/168; G06F 30/12; G06F 2206/1008
See application file for complete search history.

(56) References Cited

U.S. PATENT DOCUMENTS

| | | | | |
|---|---|---|---|---|
| 11,204,679 B1* | 12/2021 | Fischer | ............... | G06F 3/04815 |
| 11,276,236 B1* | 3/2022 | Bhushan | ............... | G06F 3/0482 |
| 2011/0246949 A1* | 10/2011 | Baszucki | ............... | G06F 30/17 |
| | | | | 715/848 |
| 2012/0262458 A1* | 10/2012 | Fowler | ............... | G06T 19/00 |
| | | | | 345/427 |
| 2014/0306993 A1* | 10/2014 | Poulos | ............... | G06T 19/006 |
| | | | | 345/633 |
| 2018/0108183 A1* | 4/2018 | Schuneman | ............. | G06F 3/0481 |
| 2018/0329596 A1* | 11/2018 | Sonnino | ............... | G06F 3/0486 |
| 2019/0096122 A1* | 3/2019 | Harlev | ............... | A61B 90/37 |
| 2019/0213799 A1* | 7/2019 | Wada | ............... | G06F 30/00 |
| 2021/0141514 A1* | 5/2021 | Fischer | ............... | G06T 19/20 |

OTHER PUBLICATIONS

Zeleznik et al., "UniCam—2D Gestural Camera Controls for 3D Environments", Brown University, 1999 (Year: 1999).*

* cited by examiner

*Primary Examiner* — Diane M Wills
(74) *Attorney, Agent, or Firm* — Ansari Katiraei LLP; Arman Katiraei; Sadiq Ansari

(57) ABSTRACT

Disclosed is a system and associated methods for improving interactions with three-dimensional ("3D") objects in a 3D space by dynamically defining the positioning of the handles used to control the interactions with the camera and/or the 3D objects. The system analyzes the positioning of different constructs that form the 3D objects. From the analysis, the system defines handles at different dynamically determined positions about the 3D objects. The system applies an edit from a first dynamically determined position about a particular 3D object in response to a user interaction with a first handle defined at the first dynamically determined position, and applies the edit from a second dynamically determined position about the particular 3D object in response to a user interaction with a second handle defined at the second dynamically determined position.

19 Claims, 11 Drawing Sheets

SYSTEMS AND METHODS FOR IMPROVED INTERACTIVITY WITH THREE-DIMENSIONAL OBJECTS

BACKGROUND

Working with three-dimensional ("3D") objects in a 3D space is challenging because of the afforded freedom of interaction. For instance, the camera, that determines which parts of which 3D object are displayed from what distances, may be positioned anywhere in the 3D space and may be rotated, orientated, or titled about 360 degrees. This freedom of camera interaction may make it difficult to obtain a desired field-of-view that presents a specific part of a specific 3D object from a specific angle, distance, or perspective. The 3D objects may also be positioned, rotated, and/or oriented anywhere in the 3D space, and scaling, rotation, transformation, and/or other edits applied to a 3D object may produce different results depending on where those edits applied relative to the 3D object. Accordingly, the freedom of interaction with 3D objects and cameras in a 3D space creates an unduly complex user experience. The user must know where and how to interact with a 3D object, and also perform very precise, controlled, and targeted interactions with the 3D object to produce desired edits.

DETAILED DESCRIPTION OF PREFERRED EMBODIMENTS

The following detailed description refers to the accompanying drawings. The same reference numbers in different drawings may identify the same or similar elements.

Provided are systems and methods for improved interactivity with three-dimensional ("3D") objects in a 3D space. The improved interactivity is provided by a 3D editing system that dynamically defines the positioning of the handles for controlling the interactions with the camera and/or 3D objects in the 3D space.

The 3D editing system sets the interactive camera and 3D object handles to dynamically determined positions. The handle at each dynamically determined position provides a different and restricted set of camera and/or object interactions.

With respect to the camera interactions, the dynamically determined positions for the camera handle set the camera point-of-rotation relative to the camera position or points about an in-focus or targeted 3D object. Setting the camera point-of-rotation prevents the user from inadvertently or unintentionally moving the camera off or away from a desired 3D object or region of the 3D object.

With respect to the 3D object interactions, the dynamically determined positions of the 3D object handles simplify 3D object editing by selecting points about a 3D object that produce precise or desired edits or effects. For instance, the 3D editing system dynamically sets different handles for scaling, rotating, translating, and/or applying other edits to different 3D objects based on the positioning of the 3D object constructs and existing relationships between the constructs and/or constructs of other neighboring 3D objects or constructs in order to preserve points of contact and/or the existing relationships when editing the 3D object constructs.

In some embodiments, the 3D editing system further improves 3D object interactivity by automatically adjusting 3D objects or constructs of the 3D objects based on detected relationships between different 3D objects or sets of constructs. The automatic adjustments may be performed to correctly orient an introduced 3D object relative to other surfaces or objects in a 3D environment and/or to correct a misalignment or gap created by manually adjusting one or more objects to establish the relationship between the one or more objects.

In some embodiments, dynamically setting the camera point-of-rotation includes automatically adjusting the camera orientation to remain on a targeted 3D object or a point on the targeted 3D object when the camera is manually repositioned in the 3D space. With the dynamically set camera point-of-rotation, the user spends less time adjusting the camera or the field-of-view on the targeted 3D object, and more time editing or interacting with the targeted 3D object.

Figure 1:
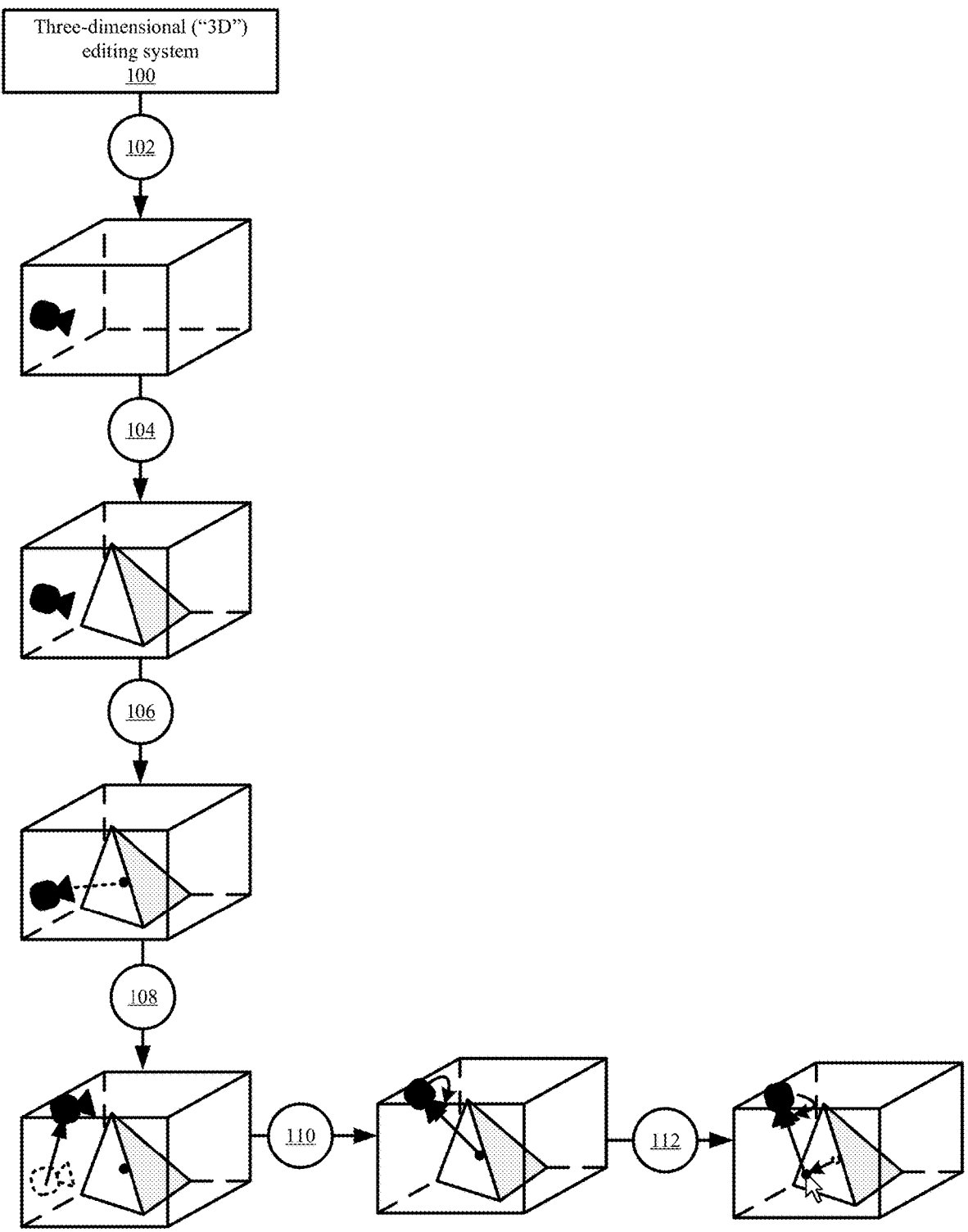
FIG. 1 illustrates an example of dynamically setting the camera handle for improved interactivity with a three-dimensional ("3D") environment in accordance with some embodiments presented herein.

FIG. 1 illustrates an example of dynamically setting the camera handle for improved interactivity with a 3D environment in accordance with some embodiments presented herein. 3D editing system 100 provides (at 102) a first position and/or orientation for the camera in a 3D environment. The first position and/or orientation may be a default position and orientation, or may be manually set by a user moving the camera.

3D editing system 100 inserts (at 104) a 3D object into the 3D environment at a user specified or default position that is outside, partially within, or otherwise not centered in the camera field-of-view. For instance, 3D editing system 100 receives user input to open, load, or import the 3D object, and additional user input to place or specify the position of the 3D object in the 3D environment.

3D editing system 100 analyzes the positional elements of the 3D object. If the 3D object is a point cloud, analyzing the positional elements includes analyzing the x, y, and z positions of each data point that forms the 3D object. If the 3D object is a 3D model constructed of meshes, polygons, or other constructs, analyzing the positional elements includes analyzing the x, y, and z positions defined for the meshes, polygons, or other constructs.

3D editing system 100 determines a center point of the 3D object from analyzing the positional elements, and dynamically sets (at 106) the camera point-of-rotation on the center point of the 3D object. In some embodiments, dynamically setting (at 106) the camera point-of-rotation on the 3D object center point includes adjusting the camera position to place the 3D object at the center of the field-of-view and/or orientating the camera so that the center point of the 3D object becomes the center point of the field-of-view.

Subsequent camera adjustments are applied relative to the point-of-rotation. For instance, if the user moves (at 108) the camera up, 3D editing system 100 repositions the camera according to the upwards movement, and automatically rotates or orients (at 110) the camera to remain fixed on the point-of-rotation while being moved up. In some embodiments, 3D editing system 100 maintains the distance of the camera from the 3D object center point such that the upwards movements involves arcing or rotating the camera over and around the 3D object center point without changing the distance between the camera and the 3D object center point. In some such embodiments, the camera movements or repositioning includes rotating about the 3D object center point. Zooming in the camera includes retaining the camera orientation and reducing the distance between the camera and the 3D object center point.

The user may invoke a control to manually reposition the point-of-rotation. FIG. 1 illustrates the user selecting a point or set of points from the 3D object, and invoking the control to cause 3D editing system 100 to reposition the camera point-of-rotation onto the user selected point or the average or center point of the set of points. 3D editing system 100 automatically adjusts (at 112) the orientation of the camera to the updated point-of-rotation. Thereafter, the camera movements are adjusted or defined relative to the updated point-of-rotation.

In some embodiments, the camera position moves with the adjusted camera point-of-rotation such that the distance and/or angle between the camera position and the point-of-rotation is unchanged. In some other embodiments, the camera position does not move with the adjusted camera point-of-rotation. For instance, the user invokes a control that frees the camera point-of-rotation from the 3D object center point, and moves the point-of-rotation, without moving the camera, to a new position.

Figure 2:
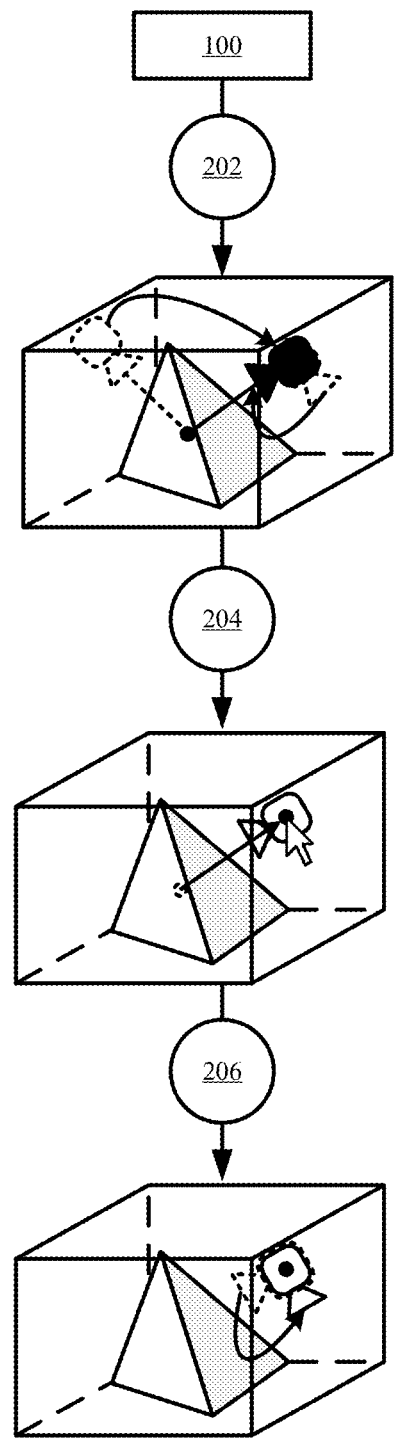
FIG. 2 illustrates an example of moving the camera point-of-rotation without moving the camera positions in accordance with some embodiments.

FIG. 2 illustrates an example of moving the camera point-of-rotation without moving the camera positions in accordance with some embodiments. As shown in FIG. 2, 3D editing system 100 rotates (at 202) the camera about the 3D object center point.

3D editing system 100 receives (at 204) input that frees the camera point-of-rotation from the 3D object center, and that moves the camera point-of-rotation to the position of the camera without adjusting the camera position. 3D editing system 100 rotates (at 206) the camera about its own position in response to the changed point-of-rotation and further input for adjusting the camera orientation or position.

In some embodiments, 3D editing system 100 receives (at 204) the input that frees the camera point-of-rotation from its existing position (e.g., the 3D object center point), and moves the camera with the point-of-rotation. For instance, once the point-of-rotation is freed, 3D editing system 100 may receive subsequent input that moves either the camera or the camera point-of-rotation with 3D editing system 100 moving both in response to the subsequent input. When moving both the camera and the camera point-of-rotation, 3D editing system 100 maintains the distance and orientation of the camera relative to the camera point-of-rotation.

In some embodiments, 3D editing system 100 dynamically determines positions for multiple handles on a 3D object against which to set the camera point-of-rotation. 3D editing system 100 determines the handle position or positions for the camera points-of-rotation based on a positional analysis of the data points, meshes, polygon, and/or other constructs that form the 3D object.

3D editing system 100 analyzes the 3D object data to determine two or more of the 3D object's center, center-of-mass, top, bottom, left, right, and/or various features of the 3D object. For instance, 3D editing system 100 may use object recognition, pattern recognition, or different artificial intelligence and/or machine learning ("AFIVIL") techniques to differentiate between features or elements of the 3D object that may be of interest, and may dynamically determine a position for the camera point-of-rotation for each feature or element. As a specific example, the 3D object may represent a character, and 3D editing system 100 may dynamically determine different positions for the camera point-of-rotation about the character's head, each of the character's arms, the character's torso, and each of the character's legs to simplify the viewing and interaction with each of the character's features or elements without the user manual positioning the camera to shift the field-of-view onto those points. 3D editing system 100 transitions between each of the dynamically determined positions for the point-of-rotation in user to specific user input.

The dynamically determined points-of-rotation differ from waypoints that are stored with a 3D object because the dynamically determined points-of-rotation are not predefined or set by a user or 3D object creator. Instead, 3D editing system 100 defines the camera points-of-rotation based on the positional values or coordinates of the constructs that form the 3D object. If the constructs change positions, then 3D editing system 100 may change the points-of-rotation for the camera.

Figure 3:
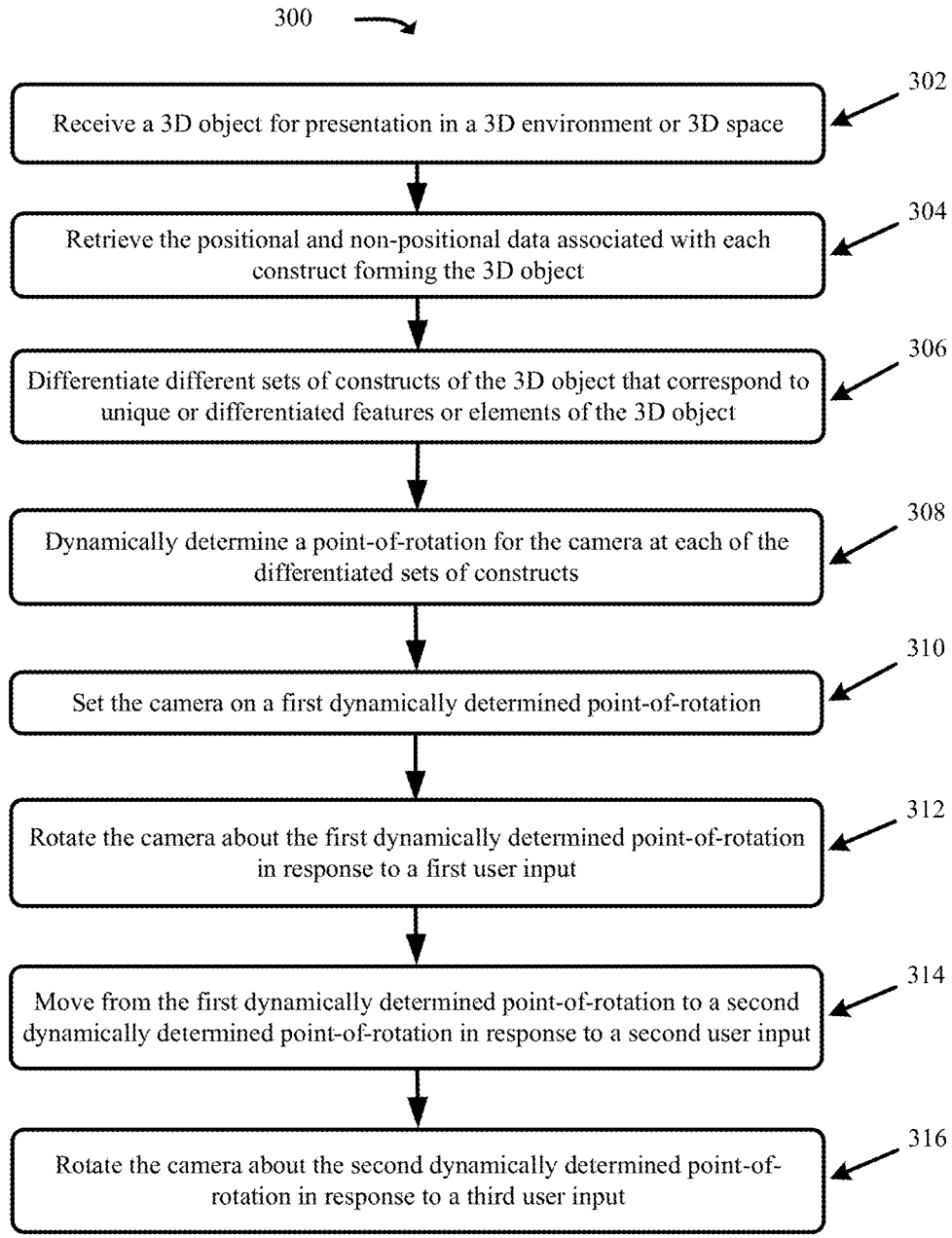
FIG. 3 presents a process for dynamically determining the positions for multiple camera points-of-rotation about a 3D object in accordance with some embodiments presented herein.

FIG. 3 presents a process 300 for dynamically determining the positions for multiple camera points-of-rotation about a 3D object in accordance with some embodiments presented herein. Process 300 is implemented by 3D editing system 100.

3D editing system 100 includes one or more devices or machines with processing, memory, storage, network, and/or other hardware resources that perform the dynamic setting of the camera points-of-rotation, dynamic setting object handles described below, and other functionality related to the rendering, viewing, editing, and interacting with/of the 3D object. 3D editing system 100 generates a user interface and provides interactive controls for the viewing, editing, and interaction with different 3D objects.

Process 300 includes receiving (at 302) a 3D object for presentation in a 3D environment or 3D space. The 3D object may be represented as a 3D mesh model, 3D polygonal model, a point cloud, and/or another 3D format.

Process 300 includes retrieving (at 304) the positional and non-positional data associated with each construct forming the 3D object. The positional data specifies the position (e.g., x, y, and z coordinates) of a construct relative to other constructs of the 3D object or relative to the 3D space. The positional data may also include a surface normal that identifies the direction at which the data point, mesh, polygon, or construct was scanned or detected. The non-positional data specifies the visual characteristics of the construct. The non-positional data includes color values (e.g., red, green, blue, and/or other color values), hyperspectral values for properties of the construct captured using non-visible light (e.g., infrared, ultraviolet, and/or other non-visible bands of the electromagnetic spectrum), material properties of the construct (e.g., wood, plastic, ceramic, etc.), reflectivity, transparency, albedo, and/or other properties of the surface or feature represented by the construct.

Process 300 includes differentiating (at 306) different sets of constructs of the 3D object that correspond to unique or differentiated features or elements of the 3D object. The differentiation (at 306) is performed using one or more feature recognition, pattern recognition, and/or AI/ML techniques.

In some embodiments, the feature recognition or the pattern recognition involves detecting commonality or patterns amongst the positional and/or non-positional elements of a set of data points, meshes, polygons, or other constructs of the 3D object. For instance, 3D editing system 100 may identify a first feature of the 3D object based on a first set of data points that form a first structure of the 3D object by virtue of the first set of data points being positioned according to a first positional arrangement or pattern and having color values that are within a first range of color values, and may identify a second feature of the 3D object based on a second set of data points that form a second structure of the 3D object by virtue of the second set of data points being positioned according to a second positional arrangement or pattern and having color values that are within a second range of color values.

In some embodiments, 3D editing system 100 renders the 3D object, and passes the rendered result to one or more AI/ML techniques. The AI/ML techniques may be trained with sample images of different object features or elements, and may compare different regions of the rendered results against models of recognized features or elements. The AI/ML techniques may classify different regions of the rendered 3D object with feature or element identifiers, and 3D editing system 100 may associate each identifier to the set of constructs that generated that part of the rendered 3D object.

The differentiated (at 306) features or elements of the 3D object may represent specific positions of the 3D object. For instance, 3D editing system 100 may differentiate (at 306) a first set of constructs that have the topmost positions to identify the top of the 3D object, and a second set of constructs that have the bottommost positions to identify the bottom of the 3D object. Similarly, 3D editing system 100 may identify different sets of constructs that form the left and right sides of the 3D object, front and back sides, and/or other positions of the 3D object that a user may want to focus the camera on when editing or interacting with the 3D object.

Process 300 includes dynamically determining (at 308) a point-of-rotation for the camera at each of the differentiated sets of constructs. The position for a point-of-rotation with a particular set of constructs may be defined based on the average of the positional data from the particular set of constructs, or based on one or more constructs with maximum or minimum positional data within the particular set of constructs.

Process 300 includes setting (at 310) the camera on a first dynamically determined point-of-rotation. The first dynamically determined point-of-rotation may be positioned at the center of the 3D object or about the 3D object's center-of-mass. The first dynamically determined point-of-rotation allows the user to traverse and/or view all of the 3D object.

Process 300 includes rotating (at 312) the camera about the first dynamically determined point-of-rotation in response to a first user input. The camera may be moved in any direction or to any depth, and 3D editing system 100 may tilt or orient the camera so that it remains focused on or centered on the first dynamically determined point-of-rotation. Accordingly, the first user input may be used to change the angle, perspective, or distance at which the set of constructs associated with the first dynamically determined point-of-rotation and other neighboring constructs are presented without the user having to manually change the tilt or orientation of the camera at each of the different angles, perspectives, or distances. Instead, the user simply changes the camera position, and 3D editing system 100 uses the first dynamically determined point-of-rotation to adjust the orientation of the camera to remain fixed on the first dynamically determine point-of-rotation wherever the camera is moved in the 3D space around the 3D object.

Process 300 includes moving (at 314) from the first dynamically determined point-of-rotation to a second dynamically determined point-of-rotation in response to a second user input. For instance, the user may invoke a directional control (e.g., a directional gesture, a directional flick or slide action on a touch sensitive surface, or a directional key press) that moves the point-of-rotation to the next point-of-rotation that is defined in the direction of the directional control. An upwards transition may shift the point-of-rotation from a center of the 3D object to a top of the 3D object, whereas a downwards transition may shift the point-of-rotation from the center of the 3D object to a bottom of the 3D object. Similarly, an upwards transition may shift the point-of-rotation from a set of constructs representing the chest of a 3D modeled character to a set of constructs representing a head of the 3D modeled character, and a leftwards transition may shift the point-of-rotation from the set of constructs representing the chest of the 3D modeled character to a set of constructs that form the character's left arm.

Changing the point-of-rotation from one dynamically determined point-of-rotation to another improves user interaction with the 3D object as it shifts the focus and/or camera field-of-view to specific features of the 3D object with as little as a single keypress rather than performing a series of intricate camera movements and orientation adjustments. In other words, 3D editing system 100 automatically brings different features of the 3D object into view and keeps focus on those specific features without a user manually moving and orienting a camera on each feature and without the user having to readjust the orientation of the camera towards a particular feature whether the position of the camera is change in 3D space. 3D editing system 100 automatically adjusts the camera orientation towards the selected point-of-rotation wherever the camera is moved. Consequently, the user spends more time editing the feature that is focused on from a particular point-of-rotation rather than bringing that feature continually into view.

Process 300 includes rotating (at 316) the camera about the second dynamically determined point-of-rotation in response to a third user input. Rotating (at 316) the camera about the second dynamically determined point-of-rotation produces a different effect and brings different constructs of the 3D object into view than rotating (at 312) the camera about the first dynamically determined point-of-rotation even when the same input is provided for each rotation. For instance, the user may move the camera to the same positions in the 3D space, but 3D editing system 100 changes the camera orientation at those same positions when different dynamically determined points-of-rotation are selected.

Figure 4:
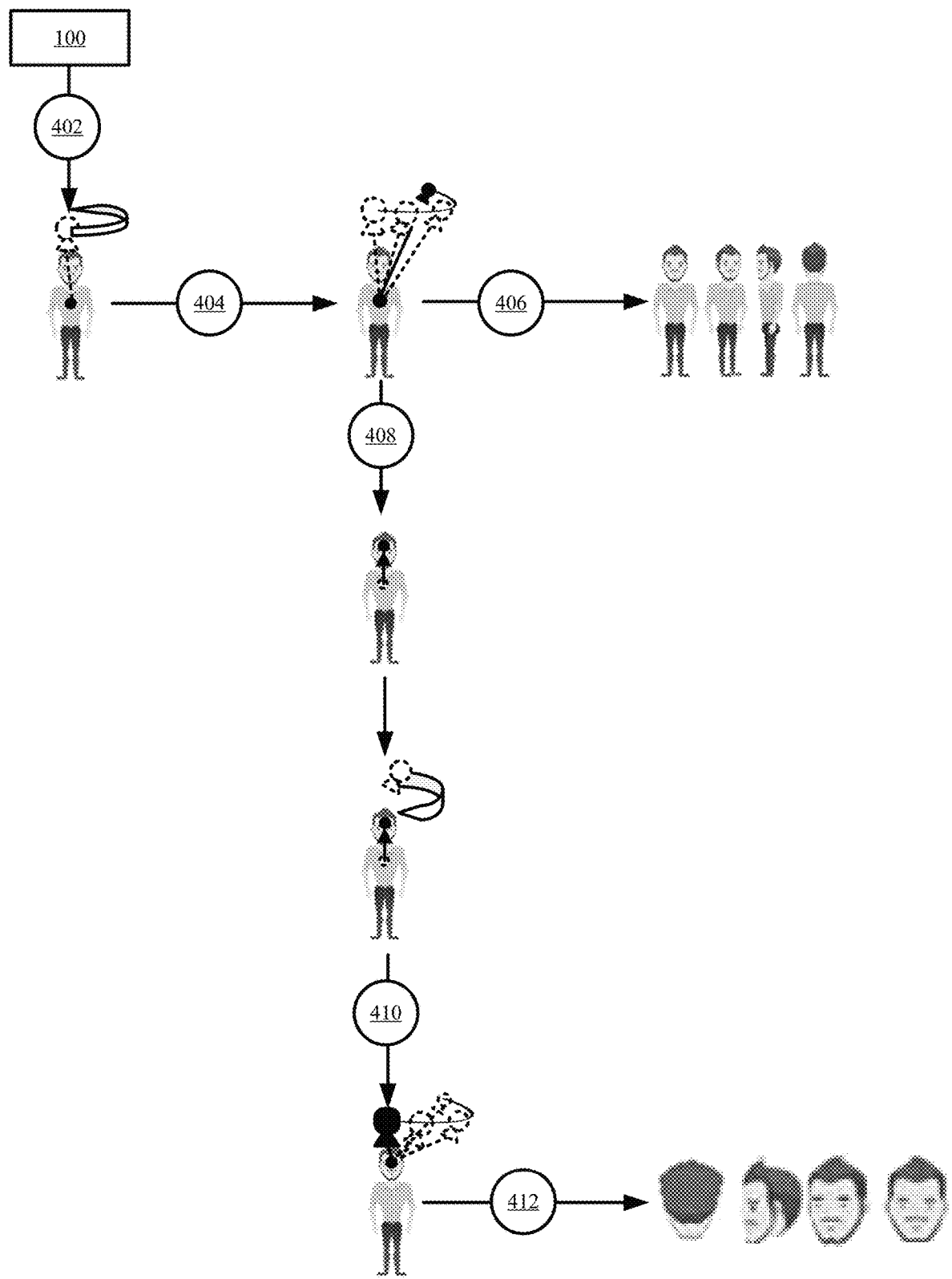
FIG. 4 illustrates an example of rotating the camera about different dynamically set handles for the camera points-of-rotation in accordance with some embodiments presented herein.

FIG. 4 illustrates an example of rotating the camera about different dynamically set handles for the camera points-of-rotation in accordance with some embodiments presented herein. 3D editing system 100 dynamically sets (at 402) the camera point-of-rotation at the center of a 3D character. The user moves the camera from the 3D character front to the 3D character back by selecting and adjusting the camera position. The user does not change the camera orientation while moving the camera. However, as the camera is moved, 3D editing system 100 automatically tilts or rotates (at 404) the camera to remain on the 3D character center (e.g., the dynamically set (at 402) point-of-rotation). In some embodiments, 3D editing system 100 renders (at 406) different images of the 3D character from the different camera positions focusing on the 3D character center.

3D editing system 100 changes (at 408) the point-of-rotation in response to user input. For instance, the user presses an up arrow key, or selects and moves the point-of-rotation up. Specifically, 3D editing system 100 changes (at 408) the point-of-rotation from the 3D character center to the 3D character head.

The user moves the camera back to its original position (e.g., from the 3D character back to the 3D character front) with additional input. In response to the camera movement, 3D editing system 100 automatically tilts or rotates (at 410) the camera to remain on the 3D character head (e.g., the changed point-of-rotation), and renders (at 412) different images of just the 3D character head that is in the field-of-view from the second point-of-rotation. Accordingly, the same camera positions produce different images when the camera is linked to different points-of-rotation.

To further improve interactivity with the 3D objects, 3D editing system 100 automatically sets handles at different positions about the 3D objects in order to change the effect that different edits have on the 3D object. Specifically, an object handle defines the point about a 3D object at which an edit is applied and the effect produced by the edit is performed or centered on the 3D object. For instance, rotate, scale, transform, and/or other edits or interactions produce different results when applied to the center of a 3D object and when applied to the sides, top, bottom, or other parts of the 3D object. The object handle defines the point about which the 3D object is rotated, scaled, or transformed.

3D editing system 100 analyzes the structure of the 3D object and/or the position of the 3D object relative to other neighboring objects. 3D editing system 100 defines each object handle according to the 3D object analysis. Specifically, 3D editing system 100 dynamically determines positions about a 3D object for scaling, rotating, translating, and/or other editing of the 3D object that preserve points-of-contact and/or relationships between the 3D object and neighboring 3D objects.

3D editing system 100 also dynamically determines the orientation and/or direction of each handle. 3D editing system 100 determines the orientation and/or direction of a handle based on the coordinate system of the 3D environment and the positioning of the 3D object in that coordinate system.

In some embodiments, 3D editing system 100 sets the orientation and/or direction of a 3D object editing handle relative to the user or camera position. In other words, 3D editing system 100 may dynamically adjust the orientation and/or direction of a handle about a 3D object depending on the angle with which the 3D object is presented or viewed in a field-of-view so that the handle is not statically attached to the 3D object, but is defined to simplify interactions with the 3D object. For instance, when an editing tool or function (e.g., scale, rotate, transform, etc.) is activated, 3D editing system 100 defines the editing tool handle to be aligned with the camera position so that the adjustments or edits to the 3D object are defined relative to the camera and object position.

Figure 5:
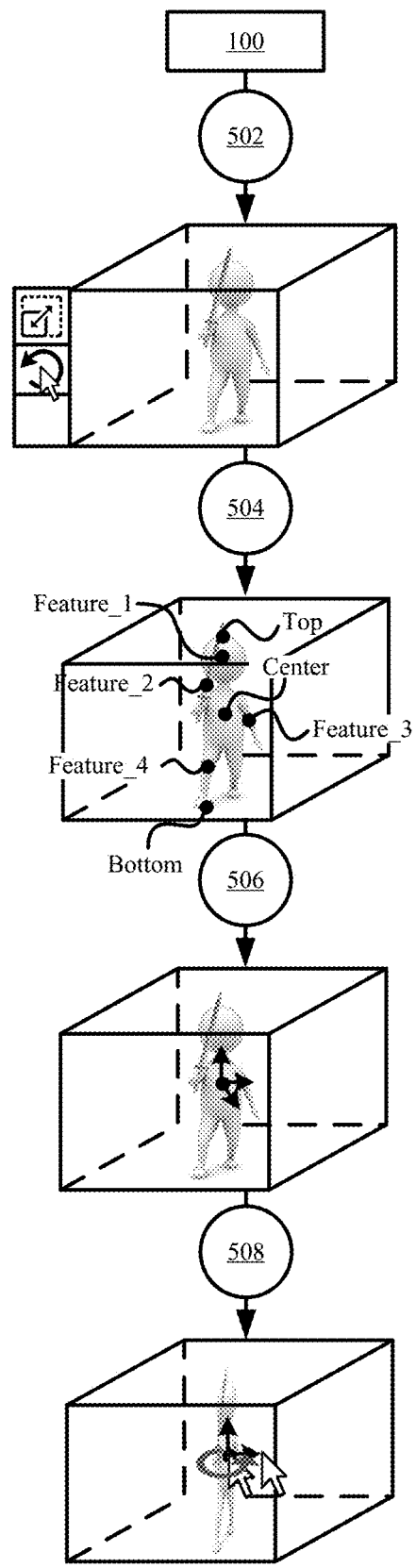
FIG. 5 illustrates an example of dynamically determining handle positions to improve 3D object interactions in accordance with some embodiments presented herein.

FIG. 5 illustrates an example of dynamically determining handle positions to improve 3D object interactions in accordance with some embodiments presented herein. 3D editing system 100 activates (at 502) a 3D edit function in response to user input. The 3D edit function is shown to be a 3D object rotation function, but may include other 3D editing functions such as scaling or transforming the 3D object.

3D editing system 100 analyzes the positions of the data points, polygons, meshes, or other constructs that form the 3D object being edited, and determines (at 504) one or more of the 3D object's center point, center-of-mass, top, bottom, frontmost point, backmost point, sides, and/or other differentiated features or elements of the 3D interest. In some embodiments, the analysis includes detecting sets of constructs that have certain patterns or commonality in their positioning or coloring, and differentiating the features or elements of the 3D object based on the detected patterns or commonality. In some embodiments, 3D editing system 100 uses object recognition, feature recognition, and/or AI/ML techniques to differentiate the 3D object features or elements. When the 3D environment includes multiple 3D objects, 3D editing system 100 analyzes the positions of each 3D object separately and collectively in order to determine the center point of each 3D object and the center point of the collective 3D environment.

The analysis further includes determining the positioning of the constructs relative to the camera position. In some embodiments, 3D editing system 100 uses the surface normals defined for each data point, mesh, polygon, or construct to determine the angle or direction of the construct relative to the camera position, and to determine the angle or direction of the surface formed by a set of constructs relative to the camera position.

3D editing system 100 dynamically sets (at 506) one or more handles about the 3D object based on the 3D object analysis. As shown in FIG. 5, 3D editing system 100 places a first handle at the determined center of the 3D object in response to the activation (at 502) of the 3D edit function.

The user interacts with the handle, and 3D editing system 100 controls (at 508) the rotation or other 3D edits that are applied to the center of the 3D object in response to the user interactions with the handle. In this case, the 3D object is rotated about its center using the dynamically set (at 506) handle. If the user applied the same rotation at an off-center position about the 3D object that appears to be the center of the 3D object but is not, then the 3D object may be rotated off-axis or tilted which would force the user to perform another rotation to compensate and correct for the unintended tilting.

Figure 6:
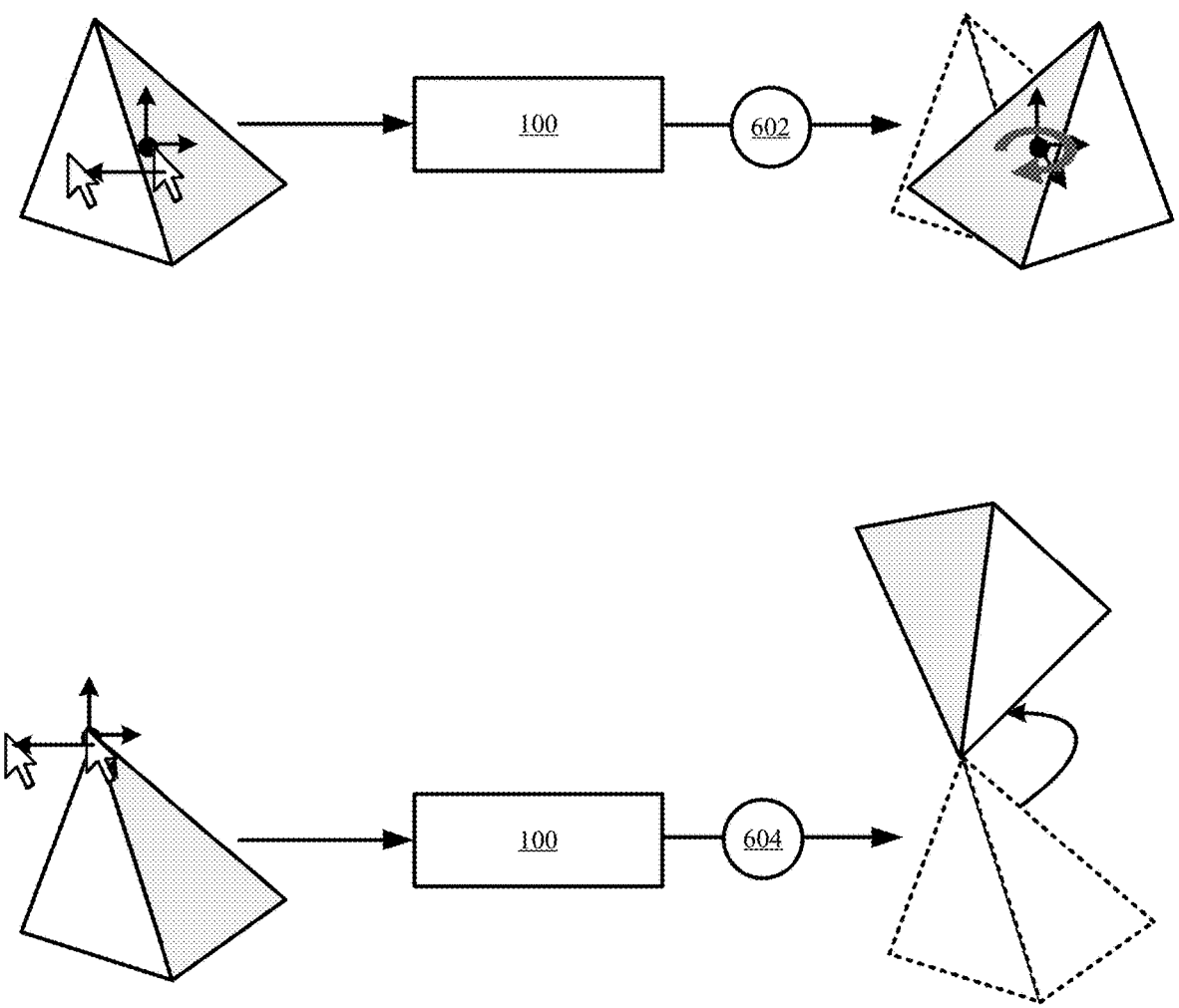
FIG. 6 illustrates different effects produced when rotating the same 3D object using different dynamically determined object handles in accordance with some embodiments presented herein.

FIG. 6 illustrates different effects produced when rotating the same 3D object using different dynamically determined object handles in accordance with some embodiments presented herein. 3D editing system 100 produces (at 602) a first rotation effect when the rotation is applied on a first handle defined at the center of the 3D object. 3D editing system 100 produces (at 604) a second rotation effects when the rotation is applied on a second handle defined at the top of the 3D object.

In some embodiments, 3D editing system 100 performs the feature differentiation, and automatically sets the handles at the center or intersection between different 3D object features. Accordingly, the user may transition from the handle at the center of the 3D object to an automatically defined handle for a differentiated feature of the 3D object by clicking on any point along the feature, providing a directional input in the direction of the feature, or otherwise selecting the feature. The handle defined for the selected feature may then be used to rotate or otherwise adjust the selected feature from its center point or point-of-intersection with another feature separate from the other features of the 3D object and without the user having to precisely select the center point or point-of-intersection to achieve the effect.

For instance, the user may select the automatically determined handle for the arm of the 3D character, and 3D editing system 100 may resize, rotate, and/or otherwise edit the set of constructs that had positional and/or non-positional commonality and that formed the arm in response to user interactions with the handle for the arm. Specifically, 3D editing system 100 tracks the differentiated set of constructs for the arm that had specific positional and/or non-positional commonality when defining the handle for controlling interactions with the arm. 3D editing system 100 defines the handle for the arm at the center of the set of constructs. When the user interacts with the handle for arm, 3D editing system 100 applies the activated edit to the set of constructs that are associated with or that were used to define the handle for the arm.

The dynamically determined 3D object manipulation handles may be saved or stored with the 3D object to reduce the computation effort associated with subsequent interactions with the 3D object. In some embodiments, 3D editing system 100 retrieves the saved handles, and adjusts the orientation and direction of the handles to align with the current camera position.

Figure 7:
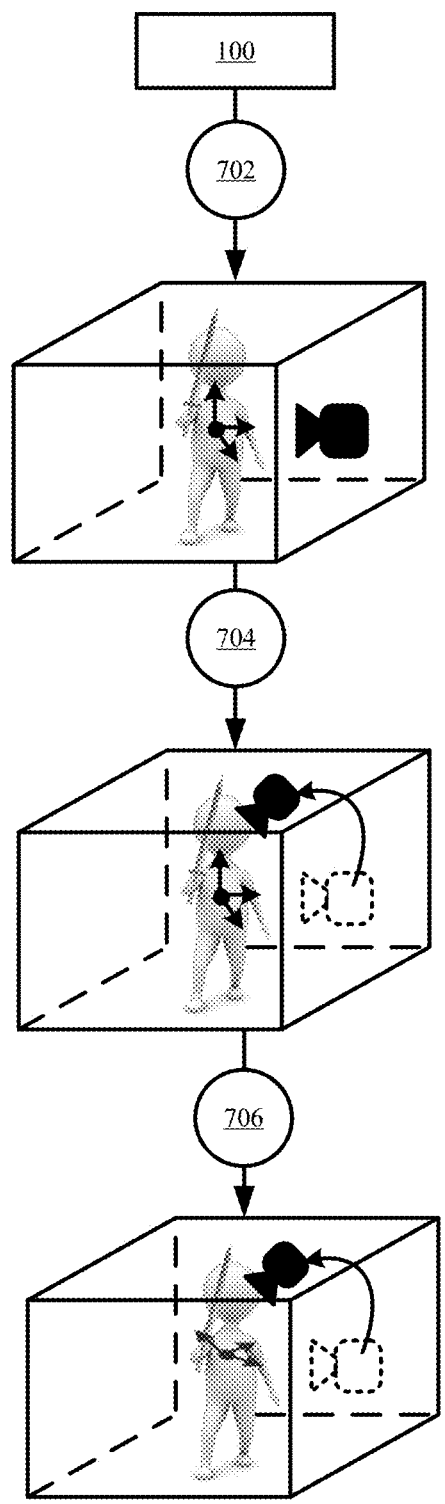
FIG. 7 illustrates an example of automatically adjusting the orientation of the dynamically determined object handles in accordance with some embodiments presented herein.

FIG. 7 illustrates an example of automatically adjusting the orientation of the dynamically determined object handles in accordance with some embodiments presented herein. 3D editing system 100 provides (at 702) a handle for editing a 3D object and the handle is orientated relative to the current camera position.

The user changes (at 704) the camera position by moving the camera to view the 3D object from a different perspective or by moving the 3D object. The handle is now misaligned with the camera position.

Accordingly, a relative adjustment specified for the misaligned handle may produce an unintended effect. For instance, if the user requests a 20 degree rotation of the 3D object, the rotation is applied relative the orientation and direction of the handle rather than relative to how the 3D object is viewed.

To produce the intended effect, 3D editing system 100 aligns (at 706) the handle after the position of the 3D object is moved relative to the camera position. Accordingly, if the user requests the same 20 degree rotation with the handle aligned with the current field-of-view or camera position, 3D editing system 100 rotates the 3D object as presented in the current field-of-view rather than based on the misaligned orientation or direction of a handle.

3D editing system 100 considers the positioning of a 3D object's constructs relative to connected, touching, or neighboring constructs of another 3D object in order to dynamically provide handles that preserve the points-of-contact and/or relationships between the 3D object and the neighboring 3D objects while disabling the edits that would remove these points-of-contact and/or relationships. For instance, 3D editing system 100 dynamically sets handles that allow a 3D object to be scaled, rotated, and/or otherwise transformed while keeping that 3D object positioned atop, over, or connected to another 3D object.

Figure 8:
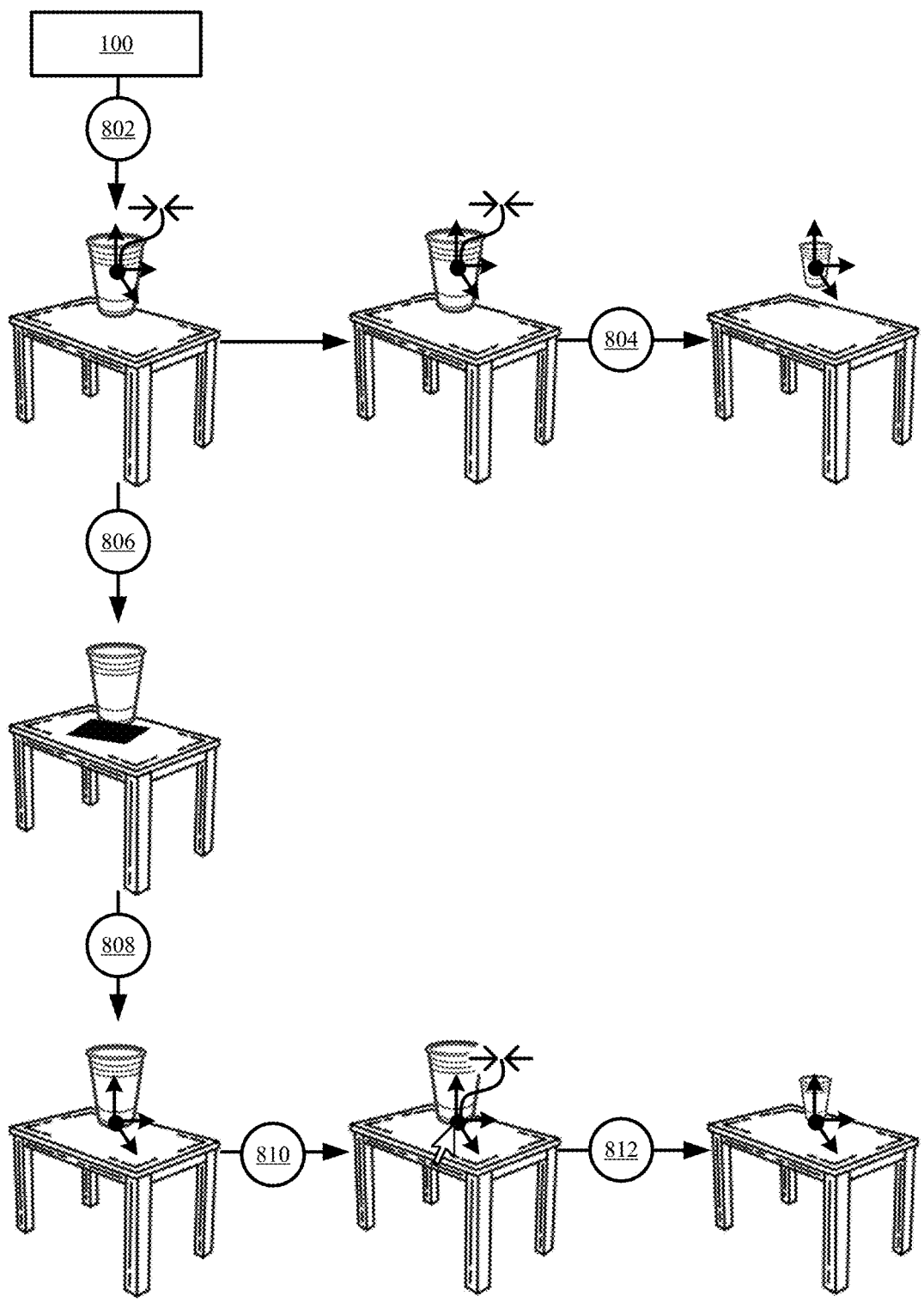
FIG. 8 illustrates an example of editing a first 3D object with dynamically determined handles that preserve the relationship between the first 3D object and a second 3D object in accordance with some embodiments.

FIG. 8 illustrates an example of editing a first 3D object with dynamically determined handles that preserve the relationship between the first 3D object and a second 3D object in accordance with some embodiments. 3D editing system 100 receives (at 802) and presents the first 3D object and the second 3D object in a 3D environment. The first 3D object is a 3D model of a cup, and the second 3D object is a 3D model of a table. The cup or first 3D object is placed over a surface of the table or the second 3D object.

Scaling (e.g., shrinking) the first 3D object about its center causes the first 3D object to detach or come off the surface of the second 3D object and look as if it is unnaturally floating over the second 3D object. FIG. 8 illustrates the scaling (at 804) of the first 3D object about a first object handle at the center of the first 3D object. To correct for this scaling adjustment, the user then performs a second edit to reposition the smaller-sized first 3D object so that it once again contacts the surface of the second 3D object.

To improve the interactions with the first 3D object and simplify the editing of the first 3D object, 3D editing system 100 analyzes the positioning of the first 3D object relative to the positioning of the second 3D object, and detects (at 806) a relationship or point-of-contact between the two 3D objects. For instance, 3D editing system 100 determines that the bottommost constructs of the first 3D object are a particular distance or offset from a set of the topmost constructs of the second 3D object. More specifically, 3D editing system 100 determines that the bottommost constructs of the first 3D object have the same x and z coordinate positions and only slightly larger y coordinate positions than the set of the topmost constructs of the second 3D object which is indicative of the two 3D objects contacting one another.

3D editing system 100 dynamically determines (at 808) a handle for the scaling edit that preserves the determined relationship between the two 3D object. Dynamically determining (at 808) the handle includes positioning the handle at the bottommost constructs of the first 3D object rather than at a center or elsewhere about the first 3D object. Accordingly, when the scale edit is applied (at 810) to enlarge or shrink the first 3D object using the handle that is automatically set at the bottommost constructs of the first 3D object, 3D editing system 100 resizes (at 812) the first 3D object from or towards the bottommost constructs, thereby retaining the resized first 3D object atop the surface of the second 3D object regardless of how much the first 3D object is enlarged or shrunk without the user having to manually reposition the resized first 3D object back atop the second 3D object.

Figure 9:
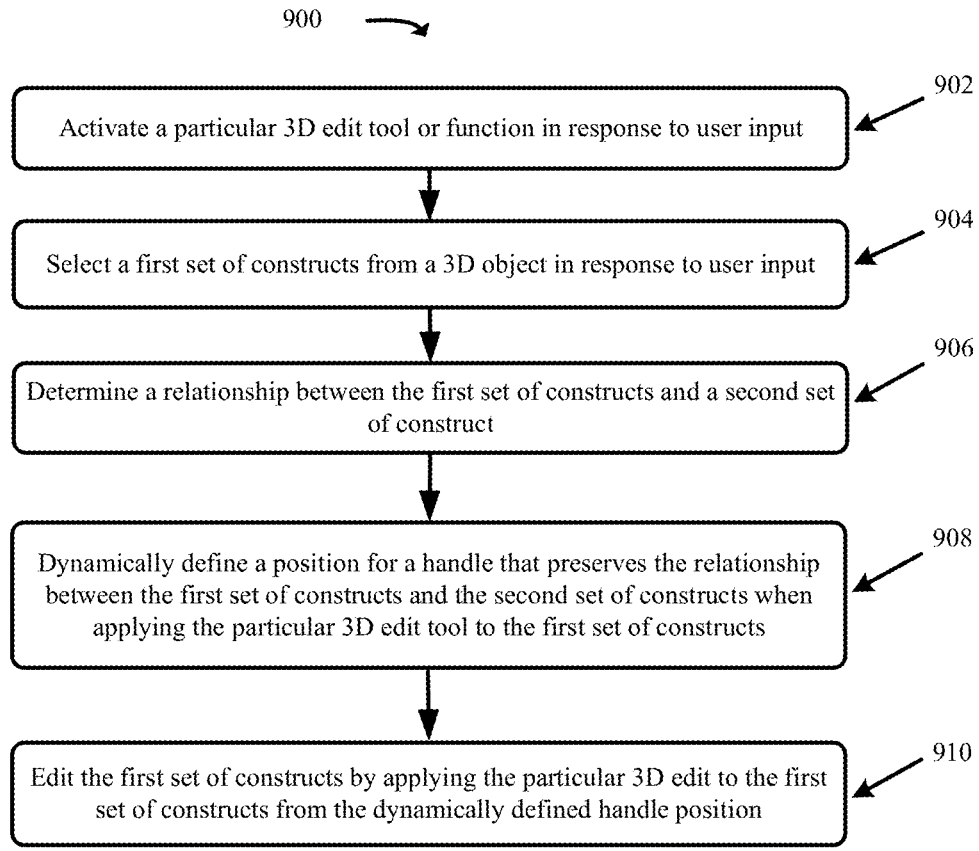
FIG. 9 presents a process for dynamically setting the editing handles to preserve relationships between one or more edited objects in accordance with some embodiments presented herein.

FIG. 9 presents a process 900 for dynamically setting the editing handles to preserve relationships between one or more edited objects in accordance with some embodiments presented herein. Process 900 is implemented by 3D editing system 100.

Process 900 includes activating (at 902) a particular 3D edit tool or function in response to user input. For instance, a user selects an icon, menu item, or button, or performs a key press or gesture that activates (at 902) the particular 3D edit tool or function from a user interface. The user interface may provide several different 3D editing tools. Rotating, scaling, translating, and transforming are examples of different 3D editing tools that may be used to edit a 3D object. Activating (at 902) the particular 3D edit tool includes enabling one or more edits that may be applied to adjust or alter 3D objects or parts of different 3D objects that are presented in the user interface.

Process 900 includes selecting (at 904) a first set of constructs from a point cloud, 3D model, or 3D object in response to user input. The selection may be made by a user using a lasso, marquee, or other selection tool to select (at 904) the first set of constructs for editing. In this case, the first set of constructs may include all or less than all of the constructs forming a particular 3D object. Alternatively, 3D editing system 100 may select (at 904) the first set of constructs in response to the user input activating an edit to apply to the particular 3D object and the particular 3D object being formed or defined with the first set of constructs. For instance, the user loads or selects the particular 3D object in conjunction with activating a scale, rotate, transform, or other editing tool.

Process 900 includes determining (at 906) a relationship between the first set of constructs and a second set of constructs. The second set of constructs may be part of the same particular 3D object as the first set of constructs, or part of a different point cloud, 3D model, or 3D object that neighbors the first set of constructs of the particular 3D object.

In some embodiments, the relationship between the first set of constructs and the second set of constructs is based on the first set of constructs contacting, touching, intersecting, being connected to, or otherwise bordering the second set of constructs. Accordingly, the relationship could be based on positional commonality or a link between the first and second sets of constructs.

3D editing system 100 determines (at 906) the relationship between the first set of constructs and the second set of constructs by analyzing the positional elements of the first and second sets of constructs, and detecting a commonality, pattern, or other association between the positioning of the different sets of constructs. In some embodiments, one or more image recognition and/or AI/ML techniques may be used to confirm or verify the relationship. For instance, the image recognition and/or AI/ML techniques may be used to determine that a first object is resting atop a second object and have a valid relationship, and may be used to determine that a third object that is vertically parallel to a fourth object are separate and independent objects that have no relationship with one another. More specifically, the image recognition and/or AI/ML techniques may be used to determine that a first object representing a 3D model of a leaf has one end or one set of constructs connected to or contacting one end or one set of constructs of a second object representing a 3D model of branch.

Process 900 includes dynamically defining (at 908) a position for a handle that preserves the relationship between the first set of constructs and the second set of constructs when applying the particular 3D edit tool to the first set of constructs. Accordingly, the handle position is dynamically defined based on where the relationship exists between the first and second sets of constructs, and also based on what edit (e.g., rotate, scale, transform, etc.) is associated with the activated (at 902) 3D edit tool. For instance, a first position is defined for a scaling edit when the first set of constructs contact the second set of constructs from above, and a second position is defined when the first set of constructs contact the second set of constructs from below. Similarly, 3D editing system 100 may define (at 908) the handle position to be at the center of the first set of constructs when the activated (at 902) 3D edit tool is a rotation edit, and may define (at 908) the handle position to be at the left side of the first set of constructs when the activated (at 902) 3D edit tool is a scaling edit and the first set of constructs contact the second set of constructs about the left side.

Process 900 includes editing (at 910) the first set of constructs by applying the particular 3D edit to the first set of constructs from the dynamically defined (at 908) handle position. The particular 3D edit is applied to preserve the relationship between the first set of constructs and the second set of constructs even after the first set of constructs have been adjusted, modified, or otherwise edited. In other words, the effect of the particular 3D edit on the first set of constructs is adjusted relative to the handle position at which the effect originates.

In some embodiments, 3D editing system 100 performs one or more automated actions based on the analysis that is used for dynamically determining the handle positions. The one or more automated actions improve interactions with the 3D objects by correcting misalignments or gaps between different 3D objects or parts of 3D objects that are difficult to manually detect and difficult to manually correct because of the precision required to correct the misalignments or gaps.

A user may construct a 3D environment by placing a first 3D object over a second 3D object. For instance, the user may drag and drop the first 3D object over the second 3D object and may perform a sequence of rotations or other adjustments so that the first 3D object appears to be resting flat atop the second 3D object. However, the first 3D object may be overly rotated so that one end or a first set of constructs of the first 3D object penetrates through constructs of the second 3D object and another end or a second set of constructs of the second 3D object is elevated off or away from the constructs of the second 3D object. Since the constructs are so small, it may be difficult to manually detect the misalignment.

3D editing system 100 analyzes the positioning of the constructs of the first and second 3D objects to detect the alignment that was intended but not correctly created because of imprecision associated with the applied manual adjustments to the two 3D objects, and automatically corrects the misalignment for the user without additional input from the user. In some embodiments, 3D editing system 100 detects the misalignment and provides a visual reference or guide to identify the misalignment to the user and allow the user to manually correct the misalignment.

Figure 10:
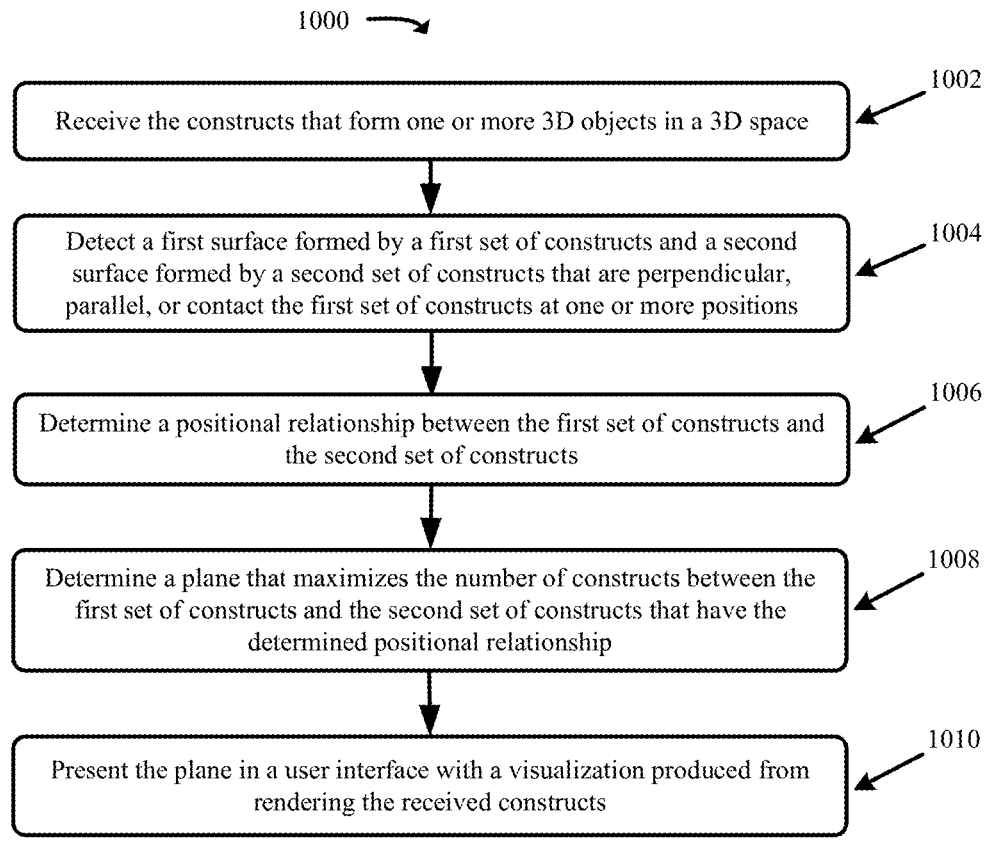
FIG. 10 presents a process for improving 3D object interactions based on a positional analysis of the 3D objects in accordance with some embodiments presented herein.

FIG. 10 presents a process 1000 for improving 3D object interactions based on a positional analysis of the 3D objects in accordance with some embodiments presented herein. Process 1000 is implemented by 3D editing system 100.

Process 1000 includes receiving (at 1002) the constructs that form one or more 3D objects in a 3D space. In some embodiments, the constructs include data points of a point cloud or meshes and polygons of a 3D model. Receiving (at 1002) the constructs includes receiving the values that are defined for the positional and non-positional elements of each construct.

Process 1000 includes detecting (at 1004) a first surface formed by a first set of constructs and a second surface formed by a second set of constructs that are perpendicular, parallel, or contact the first set of constructs at one or more positions. The first and second set of constructs represent flat or curved continuous surfaces. Detecting (at 1004) the surfaces includes analyzing the positions of the received constructs to determine each set of constructs that is aligned about one or more planes and that collectively form a repeating or common structure.

Process 1000 includes determining (at 1006) a positional relationship between the first set of constructs and the second set of constructs. Determining (at 1006) the positional relationship includes determining an angle by which the first and second sets of constructs intersect, connect, or otherwise contact one another.

Process 1000 includes determining (at 1008) a plane that maximizes the number of constructs between the first set of constructs and the second set of constructs that have the determined (at 1006) positional relationship. In some embodiments, 3D editing system 100 may initially define the plane based on the positioning of the constructs that have the determined (at 1006) positional relationship, and by tilting, rotating, or otherwise adjusting the plane to maximize the number of constructs in one or both set of constructs that contact the plane or have the positional relationship with the adjusted plane.

Process 1000 includes presenting (at 1010) the plane in a user interface with a visualization produced from rendering the received (at 1002) constructs. The plane is presented between the first and second sets of constructs to illustrate a misalignment or gap between the two sets of constructs and/or an adjustment that corrects the misalignment or gap between the two sets of constructs. In some embodiments, the plane is presented (at 1010) with coloring to identify the amount of offset between the two sets of constructs. In some embodiments, the plane is presented (at 1010) with directional arrows for the tilting, rotation, scaling, or other transformation that correct for the misalignment or gap between the two sets of constructs.

In some embodiments, 3D editing system 100 automatically corrects the misalignment or gap between the two sets of constructs. Specifically, 3D editing system 100 performs a set of adjustments to one or more of the two sets of constructs so that they are aligned with the determined (at 1008) plane that maximizes the number of constructs in the two sets of constructs that have the determined (at 1006) positional relationship.

In this manner, 3D editing system 100 may be used to improve manual adjustments made to 3D objects by users without computing and applying complex physics or gravitational effects and without defining colliders for the different 3D objects. Moreover, 3D editing system 100 may automatically orient a 3D object in a 3D environment when that 3D object is generated from an off-center scan or capture of a real object or when the 3D object is manually repositioned in the 3D environment. For instance, to perform a 3D scan of a real-world object, the real-world object may have to be tilted or rotated off-center to expose all parts of the real-world object. A 3D object that is generated from the scanning and that models the real-world object may also be tilted or rotated off-center. Accordingly, the 3D object may remain tilted or rotated off-center when introduced in a 3D environment.

3D editing system 100 analyzes the positioning of the 3D object constructs to determine its bottom and top constructs. 3D editing system 100 corrects for the improper tilt by analyzing the 3D environment to detect a surface or plane over which the 3D object is positioned. 3D editing system 100 then adjusts the tilt or rotation of the 3D object to maximize the number of constructs representing the bottom of the 3D object that are aligned with the detected surface or plane over which the 3D object is positioned. Consequently, 3D editing system 100 presents the 3D object right-side up and/or with a corrected alignment for the surfaces or planes in the 3D environment.

Figure 11:
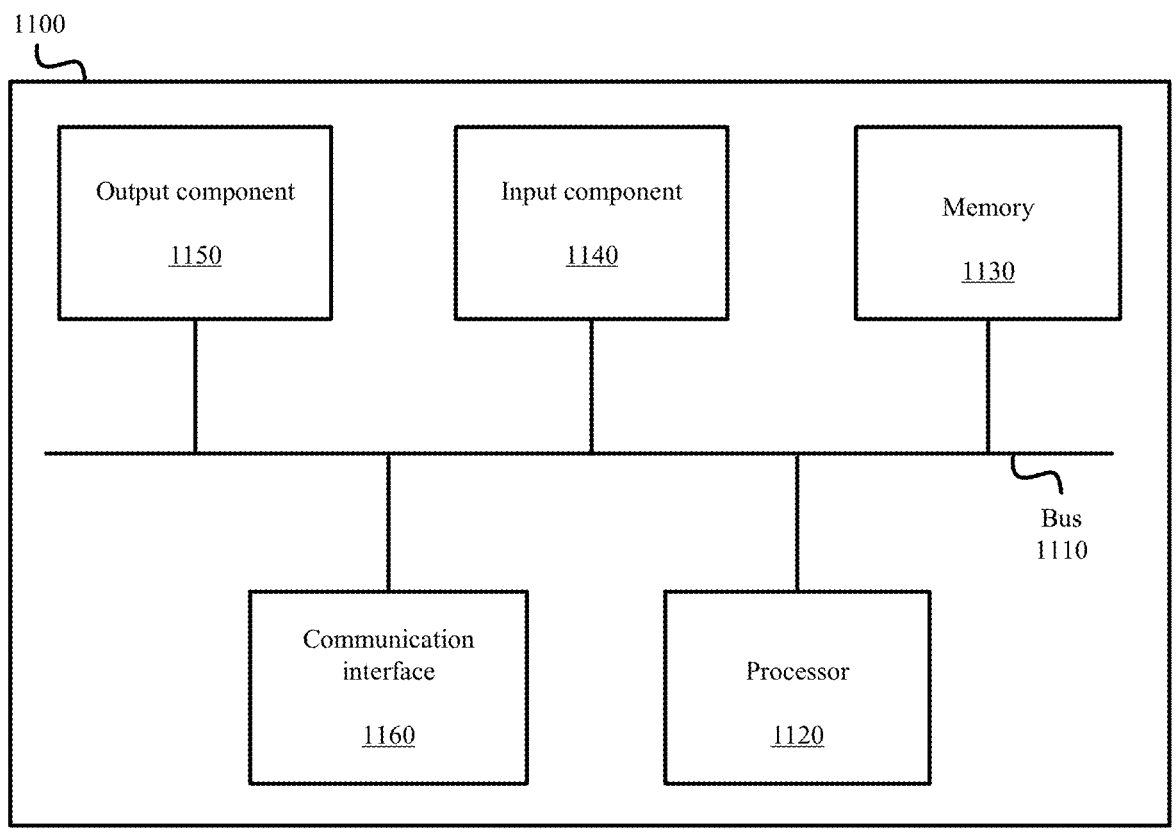
FIG. 11 illustrates example components of one or more devices, according to one or more embodiments described herein.

FIG. 11 is a diagram of example components of device 1100. Device 1100 may be used to implement one or more of the devices or systems described above (e.g., 3D editing system 100). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more LEDs, etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of constructs that form a particular three-dimensional ("3D") object in a 3D space;
   analyzing one or more of a position or color values of each construct from the plurality of constructs;
   detecting a first feature of the particular 3D object that is formed by a first set of constructs from the plurality of constructs and a second feature of the particular object that is formed by a second set of constructs from the plurality of constructs based on the first set of constructs being arranged in the 3D space according to a first pattern or having a first range of color values and the second set of constructs being arranged in the 3D space according to a different second pattern or having a different second range of color values;
   defining a plurality of handles at different dynamically determined positions that shift a camera focus from the first set of constructs that represent the first feature of the particular 3D object to the second set of constructs that represent the second feature of the particular 3D object;
   selecting a first handle of the plurality of handles in response to a first user input;
   changing an orientation of a camera to a first dynamically determined position defined for the first handle without changing a position of the camera in response to said selecting of the first handle, wherein changing the orientation to the first dynamically determined position comprises placing the camera focus on the first feature of the particular 3D object;
   applying a particular edit to the particular 3D object from the first dynamically determined position;
   selecting a second handle of the plurality of handles in response to a second user input;
   changing the orientation of the camera to a second dynamically determined position defined for the second handle without changing the position of the camera in response to said selecting of the second handle, wherein changing the orientation to the second dynamically determined position comprises placing the camera focus on the second feature of the particular 3D object; and
   applying the particular edit to the particular 3D object from the second dynamically determined position.

2. The method of claim 1,
   wherein applying the particular edit from the first dynamically determined position comprises rotating, scaling, or transforming the particular 3D object about the first dynamically determined position;
   wherein applying the particular edit from the second dynamically determined position comprises rotating, scaling, or transforming the particular 3D object about the second dynamically determined position; and
   wherein said rotating, scaling, or transforming the particular 3D object about the first dynamically determined position produces a different modification of the particular 3D object than said rotating, scaling, or transforming the particular 3D object about the second dynamically determined position.

3. The method of claim 1 further comprising:
determining a center of the particular 3D object based on said analyzing the one or more of the position or the color values of each construct; and
wherein defining the plurality of handles comprises placing a third handle at the center of the particular 3D object.

4. The method of claim 3 further comprising:
determining a subset of the plurality of constructs that contact constructs that form a different object; and
wherein defining the plurality of handles further comprises placing a fourth handle about the subset of constructs.

5. The method of claim 4 further comprising:
rotating, scaling, or transforming the particular 3D object from the center of the particular 3D object without preserving one or more points of contact between the subset of constructs and the constructs that form the different object in response to a user interaction with the third handle; and
rotating, scaling, or transforming the particular 3D object while preserving the one or more points of contact between the subset of constructs and the constructs that form the different object in response to a user interaction with the fourth handle.

6. The method of claim 1, wherein defining the plurality of handles comprises:
placing the first handle on one or more of the first set of constructs, and placing the second handle on one or more of the second set of constructs.

7. The method of claim 6,
wherein applying the particular edit from the first dynamically determined position comprises editing the first set of constructs that form the first feature of the particular 3D object; and
wherein applying the particular edit from the second dynamically determined position comprises editing the second set of constructs that form the second feature of the particular 3D object.

8. The method of claim 1 further comprising:
setting a point-of-rotation for the camera on the first dynamically determined position defined for the first handle; and
orienting the camera to the point-of-rotation in response to a user input that changes a position of the camera in the 3D space and causes the camera to shift off the point-of-rotation.

9. The method of claim 1 further comprising:
determining a point-of-contact between one or more constructs of the first set of constructs and one or more constructs of a different object;
determining a third dynamically determined position for a third handle that preserves the point-of-contact between the one or more constructs of the first set of constructs and the one or more constructs of the different object when the particular edit is applied; and
applying the particular edit from the third dynamically determined position by modifying the plurality of constructs that collectively form the particular 3D object without changing the point-of-contact between the one or more constructs of the first set of constructs and the one or more constructs of the different object.

10. The method of claim 1 further comprising:
determining one or more points-of-contact between the first set of constructs and the second set of constructs;
defining a plane that maximizes a number of constructs from the first set of constructs that contact the second set of constructs; and
automatically adjusting the first set of constructs to align with the plane.

11. A system comprising:
one or more hardware processors configured to:
receive a plurality of constructs that form a particular three-dimensional ("3D") object in a 3D space;
analyze one or more of a position or color values of each construct from the plurality of constructs;
detect a first feature of the particular 3D object that is formed by a first set of constructs from the plurality of constructs and a second feature of the particular object that is formed by a second set of constructs from the plurality of constructs based on the first set of constructs being arranged in the 3D space according to a first pattern or having a first range of color values and the second set of constructs being arranged in the 3D space according to a different second pattern or having a different second range of color values;
define a plurality of handles at different dynamically determined positions that shift a camera focus from the first set of constructs that represent the first feature of the particular 3D object to the second set of constructs that represent the second feature of the particular 3D object;
select a first handle of the plurality of handles in response to a first user input;
change an orientation of the camera to a first dynamically determined position defined for the first handle without changing a position of the camera in response to said selecting of the first handle, wherein changing the orientation to the first dynamically determined position comprises placing the camera focus on the first feature of the particular 3D object;
apply a particular edit to the particular 3D object from the first dynamically determined position;
select a second handle of the plurality of handles in response to a second user input;
change the orientation of the camera to a second dynamically determined position defined for the second handle without changing the position of the camera in response to said selecting of the second handle, wherein changing the orientation to the second dynamically determined position comprises placing the camera focus on the second feature of the particular 3D object; and
apply the particular edit to the particular 3D object from the second dynamically determined position.

12. The system of claim 11,
wherein applying the particular edit from the first dynamically determined position comprises rotating, scaling, or transforming the particular 3D object about the first dynamically determined position;
wherein applying the particular edit from the second dynamically determined position comprises rotating, scaling, or transforming the particular 3D object about the second dynamically determined position; and
wherein said rotating, scaling, or transforming the particular 3D object about the first dynamically determined position produces a different modification of the particular 3D object than said rotating, scaling, or transforming the particular 3D object about the second dynamically determined position.

13. The system of claim 11, wherein the one or more hardware processors are further configured to:
    determine a center of the particular 3D object based on said analyzing the one or more of the position or the color values of each construct and
    wherein defining the plurality of handles comprises placing a third handle at the center of the particular 3D object.

14. The system of claim 13, wherein the one or more hardware processors are further configured to:
    determine a subset of the plurality of constructs that contact constructs that form a different object; and
    wherein defining the plurality of handles further comprises placing a fourth handle about the subset of constructs.

15. The system of claim 11, wherein defining the plurality of handles comprises:
    placing the first handle on one or more of the first set of constructs, and placing the second handle on one or more of the second set of constructs.

16. The system of claim 11, wherein the one or more hardware processors are further configured to:
    set a point-of-rotation for the camera on the first dynamically determined position defined for the first handle; and
    orient the camera to the point-of-rotation in response to a user input that changes a position of the camera in the 3D space and causes the camera to shift off the point-of-rotation.

17. The system of claim 11, wherein the one or more hardware processors are further configured to:
    determine a point-of-contact between one or more constructs of the first set of constructs and one or more constructs of a different object;
    determine a third dynamically determined position for a third handle that preserves the point-of-contact between the one or more constructs of the first set of constructs and the one or more constructs of the different object when the particular edit is applied; and
    apply the particular edit from the third dynamically determined position by modifying the plurality of constructs that collectively form the particular 3D object without changing the point-of-contact between the one or more constructs of the first set of constructs and the one or more constructs of the different object.

18. A method comprising:
    receiving a plurality of constructs that form one or more three-dimensional ("3D") objects in a 3D space;
    analyzing a position of each construct from the plurality of constructs;
    defining a plurality of handles at different dynamically determined positions about the one or more 3D objects based on said analyzing the position of each construct and different sets of the plurality of constructs being arranged in the 3D space according to different patterns or having different ranges of color values;
    selecting a first handle of the plurality of handles defined at a first dynamically determined position about a particular 3D object of the one or more 3D objects in response to a first user input;
    changing an orientation of a camera to the first dynamically determined position without changing a position of the camera in response to said selecting of the first handle;
    applying a particular edit to the particular 3D object from the first dynamically determined position in response to a user interaction with the first handle;
    selecting a second handle of the plurality of handles defined at a second dynamically determined position about the particular 3D object in response to a second user input;
    changing the orientation of the camera to the second dynamically determined position without changing the position of the camera in response to said selecting of the second handle; and
    applying the particular edit to the particular 3D object from the second dynamically determined position in response to a user interaction with the second handle.

19. A system comprising:
    one or more hardware processors configured to:
    receive a plurality of constructs that form one or more three-dimensional ("3D") objects in a 3D space;
    analyze a position of each construct from the plurality of constructs;
    define a plurality of handles at different dynamically determined positions about the one or more 3D objects based on said analyzing the position of each construct and different sets of the plurality of constructs being arranged in the 3D space according to different patterns or having different ranges of color values;
    select a first handle of the plurality of handles defined at a first dynamically determined position about a particular 3D object of the one or more 3D objects in response to a first user input;
    change an orientation of a camera to the first dynamically determined position without changing a position of the camera in response to said selecting of the first handle;
    apply a particular edit to the particular 3D object from the first dynamically determined position in response to a user interaction with the first handle;
    select a second handle of the plurality of handles defined at a second dynamically determined position about the particular 3D object in response to a second user input;
    change the orientation of the camera to the second dynamically determined position without changing the position of the camera in response to said selecting of the second handle; and
    apply the particular edit to the particular 3D object from the second dynamically determined position in response to a user interaction with the second handle.

* * * * *